US012809969B2

(12) United States Patent
Alexander et al.

(10) Patent No.: US 12,809,969 B2
(45) Date of Patent: Nov. 24, 2026

(54) DETECTING ANOMALOUS IDENTITY AND ACCESS MANAGEMENT ACTION EVENTS

(71) Applicant: Capital One Services, LLC, McLean, VA (US)

(72) Inventors: Guthrie Alexander, Richmond, VA (US); Taylor Studer, Windermere, FL (US); Brad Olson, Richmond, VA (US); Purushotham Reddy, Glen Allen, VA (US); Rafael Almeida, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 37 days.

(21) Appl. No.: 18/794,456

(22) Filed: Aug. 5, 2024

(65) Prior Publication Data

US 2026/0037619 A1 Feb. 5, 2026

(51) Int. Cl.
*G06F 21/55* (2013.01)

(52) U.S. Cl.
CPC .......... *G06F 21/552* (2013.01); *G06F 21/554* (2013.01)

(58) Field of Classification Search
CPC ............................. G06F 21/552; G06F 21/554
USPC ....................................................... 726/0.022
See application file for complete search history.

(56) References Cited

U.S. PATENT DOCUMENTS

| | | | | |
|---|---|---|---|---|
| 8,359,652 | B2 * | 1/2013 | Bhagwan | G06F 21/604 726/1 |
| 10,938,828 | B1 * | 3/2021 | Badawy | H04L 63/105 |
| 11,170,118 | B2 * | 11/2021 | Al-Shanqity | G06F 21/604 |
| 11,770,398 | B1 * | 9/2023 | Erlingsson | G06F 16/3329 709/224 |
| 11,790,058 | B2 * | 10/2023 | Baghani | G06F 21/125 726/26 |
| 11,895,121 | B1 * | 2/2024 | Karim | H04L 63/20 |
| 11,909,752 | B1 * | 2/2024 | Kapoor | H04L 67/306 |
| 11,991,216 | B1 * | 5/2024 | Venkatachari | H04L 63/20 |
| 12,088,609 | B1 * | 9/2024 | Boteanu | H04L 63/1425 |
| 12,184,676 | B2 * | 12/2024 | Grajek | H04L 63/20 |
| 12,309,182 | B1 * | 5/2025 | McAleer | G06F 9/455 |
| 12,393,568 | B1 * | 8/2025 | Meadows | G06F 8/71 |
| 12,537,836 | B1 * | 1/2026 | Singh | G06F 16/9535 |
| 12,580,932 | B1 * | 3/2026 | McAleer | G06F 9/5072 |
| 12,580,935 | B1 * | 3/2026 | Singh | G06F 16/9024 |
| 12,587,519 | B2 * | 3/2026 | Lin | G06F 21/335 |

(Continued)

*Primary Examiner* — Sharon S Lynch
(74) *Attorney, Agent, or Firm* — Harrity & Harrity, LLP

(57) ABSTRACT

A system for detecting anomalous identity and access management (IAM) actions obtains a change order that indicates one or more changes to be implemented in an environment. The system determines one or more expected IAM actions associated with the change order and identifies a user account associated with implementing the one or more changes in the environment. The system monitors an IAM session in the environment that is associated with the user account for an activity of the user account. The system determines, based on monitoring the IAM session and based on the one or more expected IAM actions, that an anomalous IAM action event has occurred. The system sends, to another device and based on determining that the anomalous IAM action event has occurred, a notification indicating that the anomalous IAM action event has occurred.

20 Claims, 8 Drawing Sheets

(56) References Cited

U.S. PATENT DOCUMENTS

| | | | | |
|---|---|---|---|---|
| 2004/0221234 | A1* | 11/2004 | Imai | H04L 63/083<br>715/256 |
| 2012/0224057 | A1* | 9/2012 | Gill | G06F 21/577<br>348/143 |
| 2016/0057150 | A1* | 2/2016 | Choi | H04L 63/104<br>726/1 |
| 2020/0137097 | A1* | 4/2020 | Zimmermann | H04L 63/1425 |
| 2021/0117557 | A1* | 4/2021 | Al-Shanqity | H04L 63/0892 |
| 2022/0358190 | A1* | 11/2022 | Baghani | G06F 21/121 |
| 2022/0391503 | A1* | 12/2022 | Grajek | G06F 21/606 |
| 2023/0308460 | A1* | 9/2023 | Thomas | H04L 63/102 |
| 2024/0064148 | A1* | 2/2024 | Al-Essa | H04L 63/067 |
| 2024/0106846 | A1* | 3/2024 | Kapoor | H04L 63/10 |
| 2024/0195819 | A1* | 6/2024 | Grajek | H04L 63/1416 |
| 2024/0396884 | A1* | 11/2024 | Lin | G06F 21/335 |
| 2025/0384074 | A1* | 12/2025 | Rastogi | G06F 16/345 |

* cited by examiner

DETECTING ANOMALOUS IDENTITY AND ACCESS MANAGEMENT ACTION EVENTS

BACKGROUND

A change order for an environment is a document that proposes changes to the environment. The changes can include changes to hardware, software, network configurations, or other aspects of an infrastructure of the environment. A purpose of a change order is to ensure that all changes are planned, documented, and approved (e.g., by an authorization board that manages the environment) to minimize disruptions to the environment and to maintain an integrity of the environment.

SUMMARY

Some implementations described herein relate to a system for detecting anomalous identity and access management (IAM) actions. The system may include one or more memories and one or more processors communicatively coupled to the one or more memories. The one or more processors may be configured to obtain a change order that indicates one or more changes to be implemented in an environment. The one or more processors may be configured to determine, based on the change order, one or more expected IAM actions associated with the change order. The one or more processors may be configured to identify, based on determining the one or more expected IAM actions, a user account associated with implementing the one or more changes in the environment. The one or more processors may be configured to monitor an IAM session in the environment that is associated with the user account for an activity of the user account. The one or more processors may be configured to determine, based on monitoring the IAM session and based on the one or more expected IAM actions, that an anomalous IAM action event has occurred. The one or more processors may be configured to send, to another device and based on determining that the anomalous IAM action event has occurred, a notification indicating that the anomalous IAM action event has occurred.

Some implementations described herein relate to a non-transitory computer-readable medium that stores a set of instructions. The set of instructions, when executed by one or more processors of a system for detecting anomalous identity and access management (IAM) actions, may cause the IAM to obtain a change order associated with an environment. The set of instructions, when executed by one or more processors of the IAM, may cause the IAM to determine, based on the change order, one or more expected IAM actions associated with the change order. The set of instructions, when executed by one or more processors of the IAM, may cause the IAM to monitor an IAM session in the environment that is associated with a user account associated with the change order. The set of instructions, when executed by one or more processors of the IAM, may cause the IAM to determine, based on monitoring the IAM session and based on the one or more expected IAM actions, that an anomalous IAM action event has occurred. The set of instructions, when executed by one or more processors of the IAM, may cause the IAM to send a notification indicating that the anomalous IAM action event has occurred.

Some implementations described herein relate to a method. The method may include determining, by a system for detecting anomalous identity and access management (IAM) actions and based on a change order associated with an environment, one or more expected IAM actions associated with the change order. The method may include monitoring, by the system, an IAM session in the environment that is associated the change order. The method may include determining, by the system, based on monitoring the IAM session, and based on the one or more expected IAM actions, that an anomalous IAM action event has occurred. The method may include causing, by the system, and based on determining that the anomalous IAM action event has occurred, one or more actions to be performed.

DETAILED DESCRIPTION

Figure 1A:
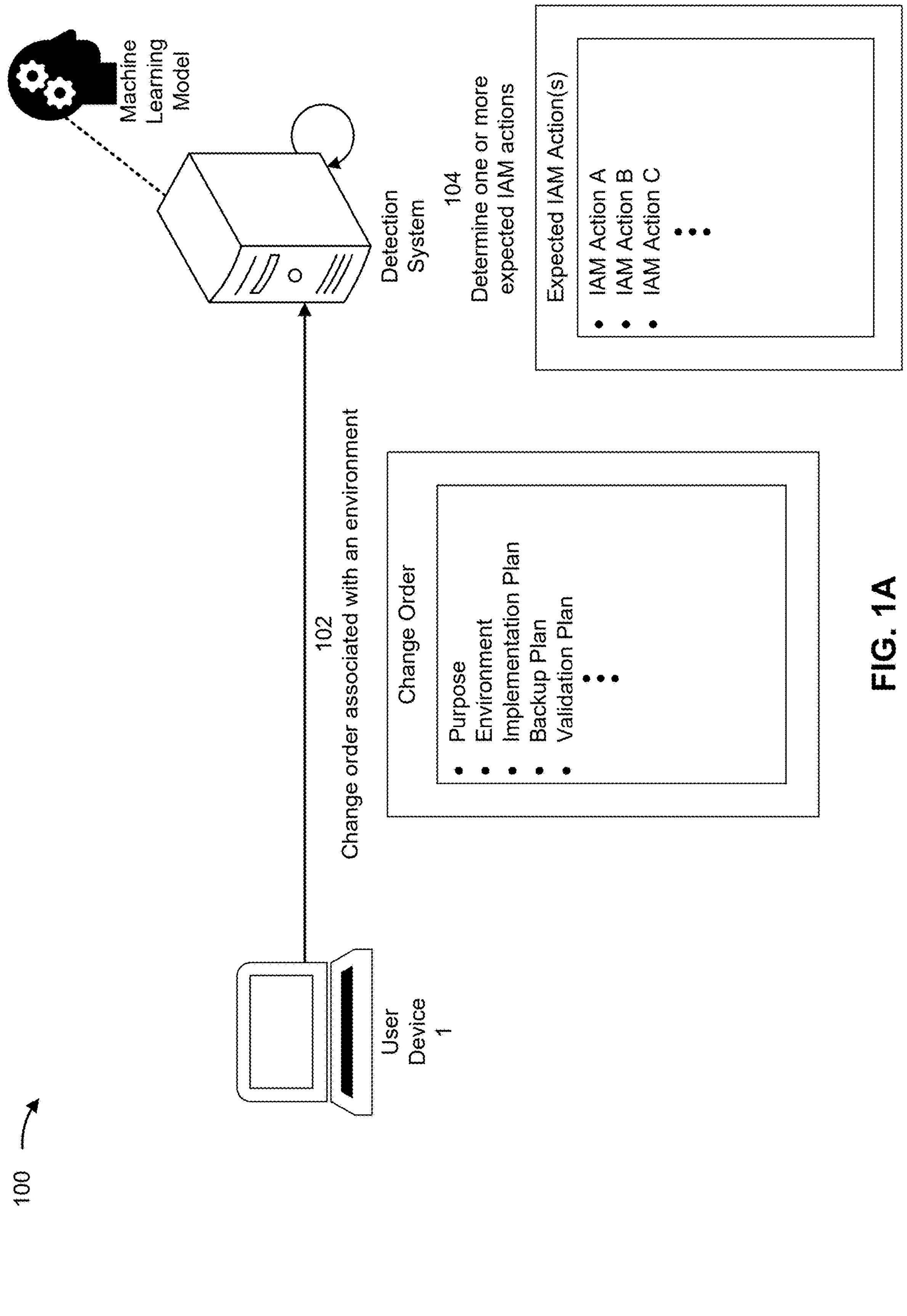
FIGS. 1A-1D are diagrams of an example associated with detecting anomalous IAM action events, in accordance with some embodiments of the present disclosure.

The following detailed description of example implementations refers to the accompanying drawings. The same reference numbers in different drawings may identify the same or similar elements.

To make a change to an environment, a requester (e.g., a user, or a user team, in charge of the change) fills out a change order that includes a description of the change, as well as additional information, such as a reason for the change, an implementation plan for the change, a testing plan for testing the change, and so on. A reviewer (e.g., an administrator, or an administrative team, such as a change advisory board (CAB), in charge of managing the environment) reviews the change order. When the reviewer deems that the change to the environment is acceptable, the reviewer approves the change order and the requester (or another user) is granted identity and access management (IAM) access to update the environment according to the change order (e.g., at a scheduled time). However, the requester can perform IAM actions, within the environment, that are outside the scope of the change order. This can pose significant risk to the environment. For example, the requester (e.g., either unintentionally, or, in a case where the requester is a bad actor, intentionally) can cause data integrity issues by modifying, deleting, or corrupting critical data and resources of the environment; can cause security issues by accessing and stealing sensitive information; and/or can cause operational performance issues by modifying, deleting, or corrupting configurations of the environment.

In some cases, an analysis system can identify a requester's anomalous IAM actions within the environment by examining a log of actions performed within the environment. However, such an analysis is typically performed after the requester has ceased performing the anomalous IAM actions, and therefore any issues are only identified posthoc. Consequently, significant computing resources (e.g., processing resources, memory resources, communication resources, and/or power resources, among other examples) of devices (e.g., that associated with managing the environment) need to be utilized to address any impact of the performance of the anomalous IAM actions that has been allowed to escalate, uninhibited, until identification of the performance of the anomalous IAM actions.

Some implementations described herein include a detection system. The detection system obtains a change order that includes one or more changes to be implemented in an environment. The detection system determines one or more expected IAM actions associated with the change order (e.g., by processing the change order using a machine learning model), which are one or more IAM actions that are expected to be performed to cause the one or more changes to be implemented in the environment. The detection system identifies a user account associated with implementing the one or more changes in the environment, and monitors an IAM session in the environment that is associated with the user account for an activity of the user account.

In some implementations, the detection system determines, based on monitoring the IAM session and based on the one or more expected IAM actions, that an anomalous IAM action event has occurred. An anomalous IAM action event may occur when the user account implements, during the IAM session, at least one change that is not within the scope of the change order. For example, an anomalous IAM action event may occur when the user account implements at least one change to a resource, a configuration, or other aspect of an infrastructure of the environment that is not indicated by the change order. The analysis system may determine that the anomalous IAM action event has occurred when the IAM action is not included in the one or more expected IAM actions.

Accordingly, the detection system sends, to another device, a notification indicating that the anomalous IAM action event has occurred. In this way, the detection system is able to detect an anomalous IAM action event in real-time (e.g., as the IAM actions are being performed by the user account in the environment), and an administrator of the environment can be timely notified about the anomalous IAM action event and thereby take actions, such as contacting the user of the user account, terminating the IAM session, removing IAM permission parameters associated with the user account, causing the user to reauthenticate the user account, or other actions to protect the environment and/or to mitigate any impact resulting from the anomalous IAM action event. Additionally, or alternatively, the detection system can automatically perform these actions (e.g., without manual intervention of the administrator). In this way, the detection system automatically protects the environment and/or reduces a magnitude of any impact to the environment that could result from implementation of the IAM action (e.g., that is associated with the anomalous IAM action event).

The detection system, therefore, facilitates timely identification of the anomalous IAM action event and timely mitigation of any impact of the anomalous IAM action within the environment. Further, by preventing, or minimizing a likelihood of, uninhibited escalation of an impact resulting from anomalous IAM actions, an amount of computing resources (e.g., processing resources, memory resources, communication resources, and/or power resources, among other examples) of devices (e.g., that are associated with managing the environment) that would otherwise be needed to be utilized to address the impact to the environment is reduced.

FIGS. 1A-1D are diagrams of an example 100 associated with detecting anomalous IAM action events. As shown in FIGS. 1A-1D, example 100 includes a plurality of user devices (shown as a user device 1 and a user device 2) and a detection system, which are described in more detail in connection with FIGS. 2 and 3.

A first user device (e.g., the user device 1) may be associated with a user. The first user device may implement a user interface (e.g., a graphical user interface), such as a web browser, which allows the user to input a change order associated with an environment (e.g., a network environment, such as a review environment, a staging environment, or a production environment). The change order may indicate, for example, one or more changes to be implemented in the environment. The one or more changes may include, for example, changes to resources, configurations, or other aspects of an infrastructure of the environment.

As a specific example, as shown in FIG. 1A, the change order, may include a purpose section (e.g., that indicates a purpose for one or more changes indicated by the change order), an environment section (e.g., that identifies the environment in which the one or more changes are to be implemented), an implementation plan section (e.g., that indicates the one or more changes and how the one or more changes are to be implemented in the environment), a backup plan section (e.g., that indicates how the one or more changes are to be implemented in the environment if the implementation plan cannot be implemented), a validation plan section (e.g., that indicates how implementation of the one or more changes is to be validated), and/or other sections.

As further shown in FIG. 1A, the detection system may obtain the change order. For example, the first user device (e.g., the user device 1) may send the change order (e.g., after the user has finished inputting the change order into the user interface of the first user device), such as via a connection between the first user device and the detection system. Accordingly, the detection system may receive the change order (e.g., via the connection between the first user device and the detection system).

As shown by reference number 104, the detection system may determine one or more expected IAM actions associated with the change order. The one or more expected IAM actions may include, for example, one or more REST actions (or other types of actions) that are expected to be performed to cause the one or more changes to be implemented in the environment. FIG. 1A shows the one or more expected IAM actions as IAM action A, IAM action B, IAM action C, and so on.

In some implementations, the detection system may process the change order to determine the one or more expected IAM actions. For example, the detection system may use an analysis technique to determine the one or more expected IAM actions. As another example, the detection system may use a machine learning model to process the change order to generate the one or more expected IAM actions. That is, the detection system may determine the one or more expected IAM actions as machine learning model output of the machine learning model.

Figure 2:
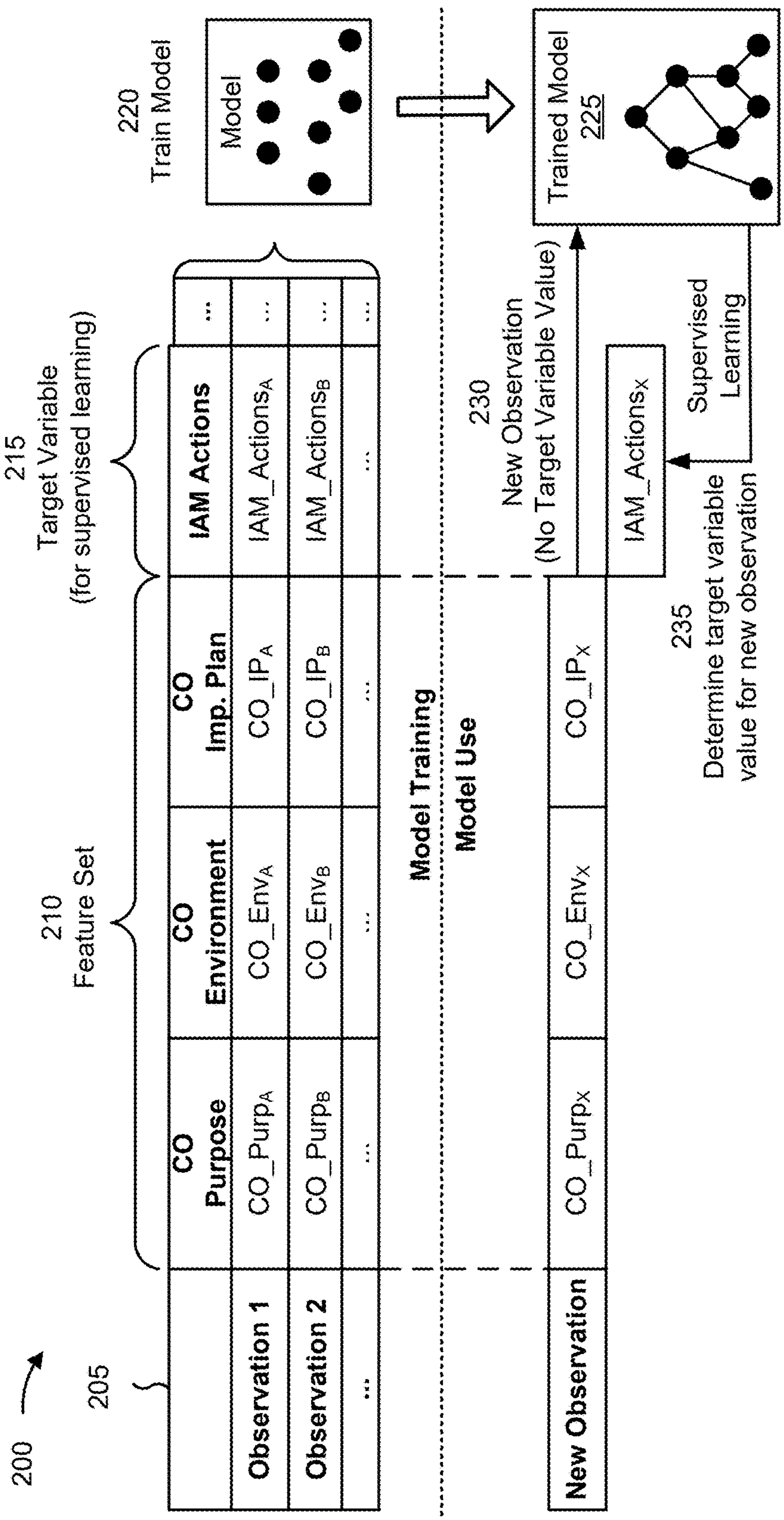
FIG. 2 is a diagram illustrating an example of training and using a machine learning model in connection with detecting anomalous IAM action events, in accordance with some embodiments of the present disclosure.

In one example, as described further in connection with FIG. 2, the machine learning model may be trained to determine the output (e.g., the one or more expected IAM actions) based on a feature set that includes one or more features. For example, the machine learning model may be trained based on change order training data (e.g., data associated with a plurality of change orders that have been previously analyzed) and IAM action training data (e.g., that indicates IAM actions for at least some of the plurality of change orders). Thus, the machine learning model may be trained to determine one or more associations and/or relationships between change orders and corresponding IAM actions.

In some implementations, the detection system may process, using a preprocessing technique, the change order before applying the machine learning model to the change order to determine the one or more expected IAM actions. For example, the detection system may convert text to lowercase, remove punctuation, remove stop words, strip white space, perform stemming, perform lemmatization, spell out abbreviations and acronyms, and/or one or more other preprocessing operations. Performing the preprocessing may improve an accuracy of the machine learning model and may conserve computing resources that would otherwise be used to apply a machine learning mode in a less efficient fashion for an un-preprocessed change order.

Figure 1B:
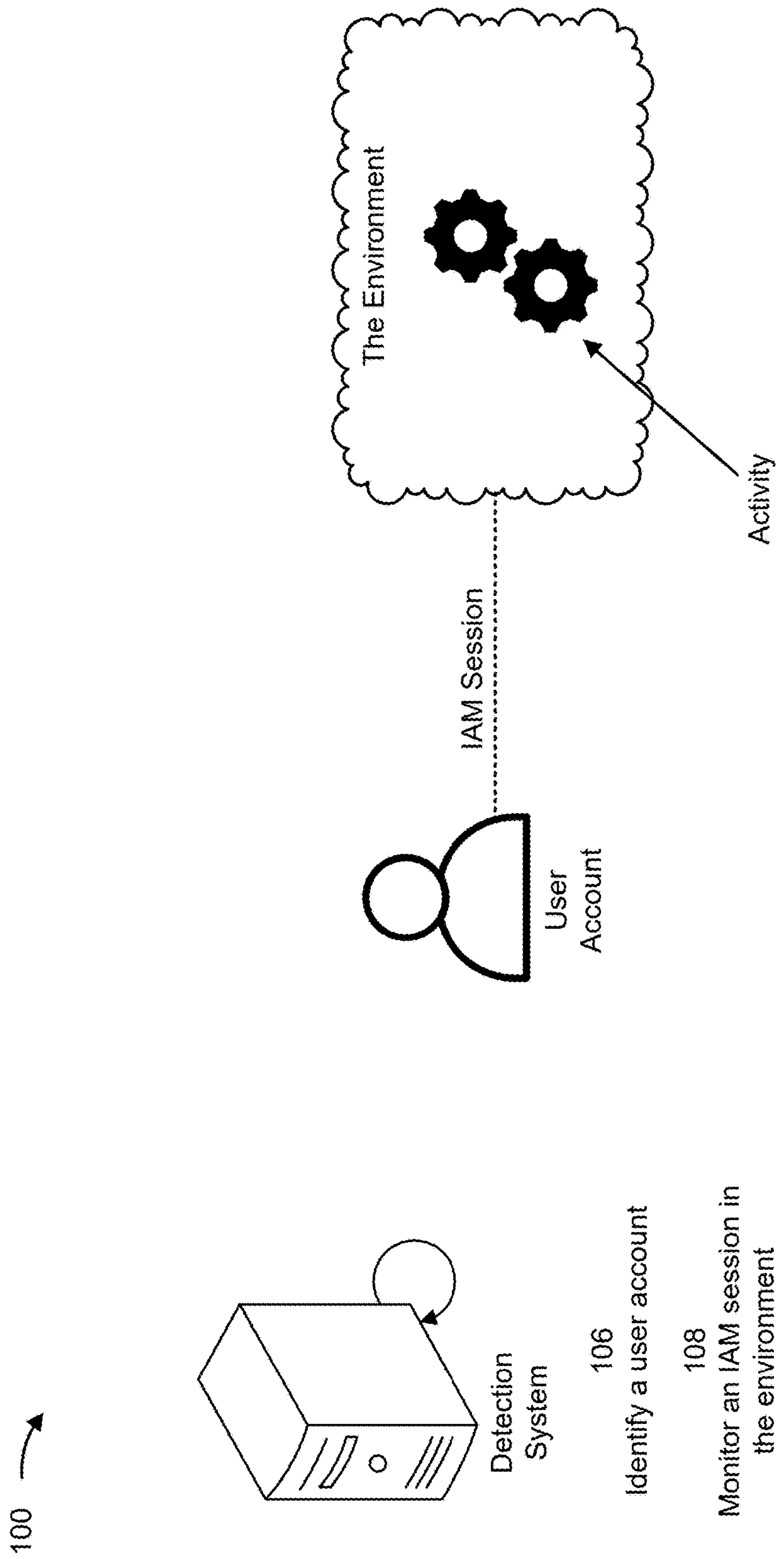

As shown in FIG. 1B, and by reference number 106, the detection system may identify a user account (e.g., based on determining the one or more expected IAM actions). The user account may be associated with implementing the one or more changes (e.g., that are indicated by the change order) in the environment. That is, the user account may be the account that is to access the environment and implement the one or more changes in the environment.

The detection system may identify the user account in association with processing the change order (e.g., to determine the one or more expected IAM actions). For example, the user account may be indicated in the change order and the detection system may identify the user account by reading and/or parsing the change order. Additionally, or alternatively, the data structure may identify the user account as a result of determining the one or more expected IAM actions (e.g., the one or more expected IAM actions may indicate that the one or more expected IAM actions are to be implemented by the user account).

As shown by reference number 108, the detection system may monitor an IAM session in the environment. The IAM session may be an IAM session that the user account initiates to allow the user account to access the environment and to implement the one or more changes (e.g., that are indicated by the change order) in the environment. In some implementations, the detection system may monitor the IAM session for an activity of the user account (e.g., within the environment).

In some implementations, the detection system, to monitor the IAM session, may cause, in the environment, a tracking function (e.g., an Amazon Web Services (AWS) CloudTrail function, or a similar tracking function) to be enabled in the environment that is associated with the user account for the IAM session. For example, the detection system may enable the tracking function to track IAM actions performed by the user account during the IAM session. The detection system then may process log information associated with the user account for the IAM session (e.g., that is generated as a result of enablement of the tracking function). In some implementations, the detection system may monitor the IAM session in real-time (or near real-time), such as by processing the log information as the log information is generated (e.g., incrementally generated in association with performance of one or more IAM actions by the user account during the IAM session).

Figure 1C:
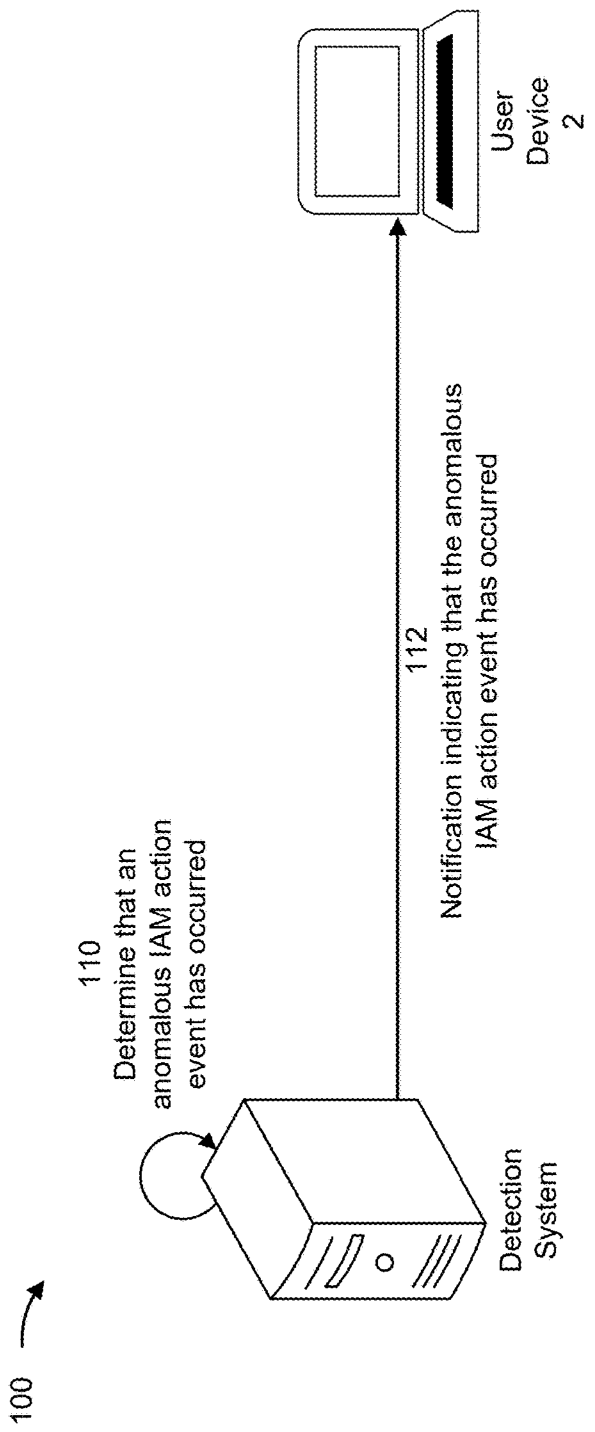

As shown in FIG. 1C, and by reference number 110, the detection system may determine that an anomalous IAM action event has occurred (e.g., based on monitoring the IAM session and based on the one or more expected IAM actions). An anomalous IAM action event may occur when the user account implements, during the IAM session, at least one change that is not within the scope of the change order. For example, an anomalous IAM action event may occur when the user account implements at least one change to a resource, a configuration, or other aspect of an infrastructure of the environment that is not indicated by the change order.

In some implementations, the detection system, to determine that the anomalous IAM action event has occurred, may identify an IAM action implemented in the environment (e.g., based on monitoring the IAM session). The IAM action, for example, may be indicated by the log information that is processed by the detection system (e.g., in association with monitoring the IAM session). The detection system may determine that the IAM action is not included in the one or more expected IAM actions. For example, the detection system may compare the IAM action to each of the one or more expected IAM actions and may determine that the IAM action is not included in the one or more expected IAM actions. Accordingly, the detection system may determine (e.g., based on determining that the IAM action is not included in the one or more expected IAM actions) that the anomalous IAM action event has occurred.

Additionally, or alternatively, the detection system, to determine that the anomalous IAM action event has occurred, may generate an anomalous IAM action event filter (e.g., based on the one or more expected IAM actions). The detection system may identify an IAM action implemented in the environment (e.g., based on monitoring the IAM session) and may cause the anomalous IAM action event filter to be applied to the IAM action to determine that the anomalous IAM action event has occurred. That is, the detection system may determine that the anomalous IAM action event has occurred when the IAM action is not included in the anomalous IAM action event filter.

As shown by reference number 112, the detection system may provide a notification (e.g., based on determining that the anomalous IAM action event has occurred). The detection system may generate the notification to indicate that the anomalous IAM action event has occurred. For example, the notification may include information identifying the IAM action, a time of performance of the IAM action, the user account, and/or the IAM session.

In some implementations, the detection system may determine a risk category associated with the anomalous IAM action event. For example, the detection system may process the anomalous IAM action event and/or the IAM action (e.g., associated with the anomalous IAM action event), using a risk analysis technique, to determine the risk category. Accordingly, the detection system may generate the notification to indicate the anomalous IAM action event and the risk category. The risk category may be, for example, a high risk category (e.g., when the IAM action makes a critical change to the environment), a low risk category (e.g., when the IAM makes a non-critical change to the environment), or another type of risk category.

As shown in FIG. 1C, the detection system may provide the notification by sending the notification to another device, such as a second user device (shown as the user device 2) of a user associated with managing the environment. The detection system may send the notification via a connection between detection system and the other device. Accordingly, the other device may receive the notification (e.g., via the connection between the detection system and the other device). In this way, the user of the other device (e.g., of the second user device) may be notified of the anomalous IAM action event and take actions to address the anomalous IAM action event. Additionally, or alternatively, the other device (and/or the detection system) may be configured to automatically address the anomalous IAM action event, and may perform one or more actions (e.g., one or more automated IAM actions), within the environment, to address any change that resulted from implementation of the IAM action associated with the anomalous IAM action event.

Figure 1D:
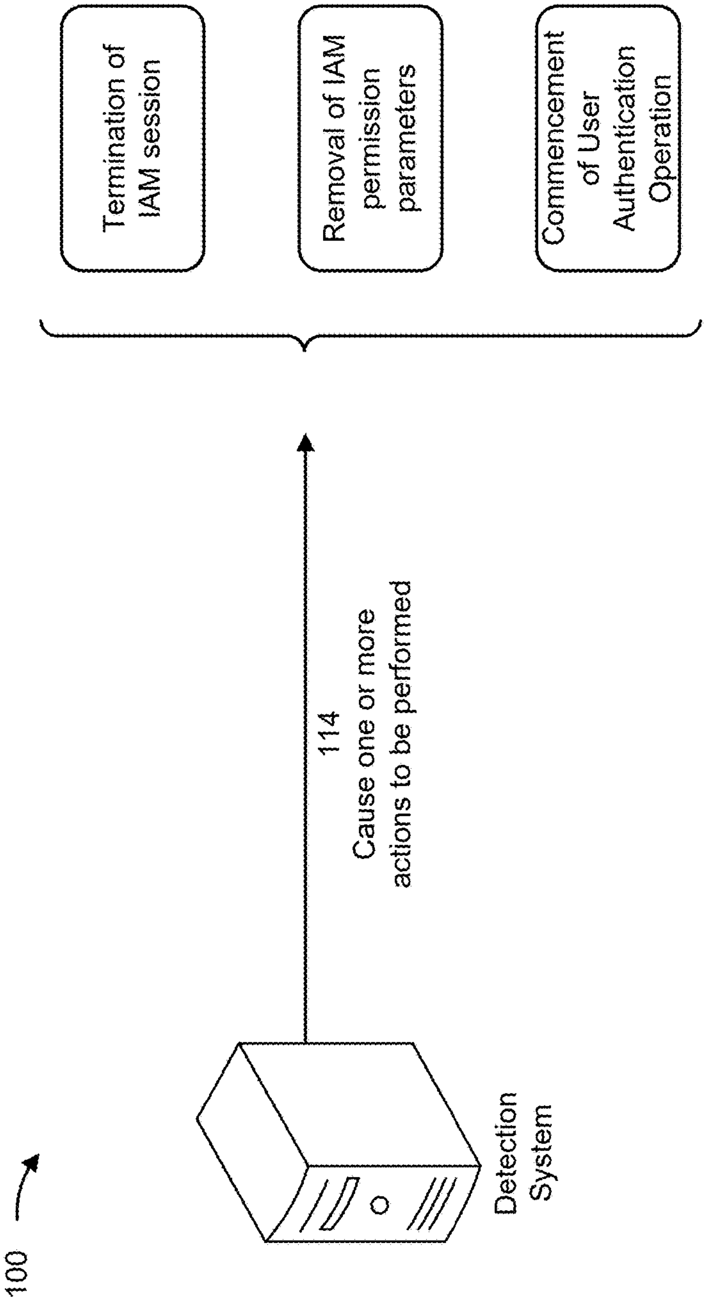

As shown in FIG. 1D, and by the reference number 114, the detection system may cause one or more actions to be performed (e.g., based on determining that the anomalous IAM action event has occurred). The one or more actions may include, as shown in FIG. 1D, termination of the IAM session. For example, the detection system may cause the IAM session to be terminated, such as when the risk category is a high risk category. In this way, the detection system may prevent additional changes to the environment via the IAM session.

In some implementations, the one or more actions may include removal of IAM permission parameters. For example, the detection system may cause the one or more IAM permission parameters to be removed from the user account. In this way, the detection system may prevent the user account from implementing, in the IAM session or another IAM session, additional changes to the environment.

In some implementations, the one or more actions may include commencement of a user authentication operation. For example, the detection system may cause a user authentication operation associated with the user account to commence. The user authentication operation may include, for example, a username and password authentication operation associated with the user account, a two-factor authentication operation associated with the user account, a biometric authentication operation associated with the user account, and/or multi-factor authentication operation associated with the user account. In this way, the detection system may prevent an impostor, or other bad actor, from further using the user account (e.g., when the user account was improperly accessed and used) and may thereby prevent additional changes to the environment.

As indicated above, FIGS. 1A-1D are provided as an example. Other examples may differ from what is described with regard to FIGS. 1A-1D.

FIG. 2 is a diagram illustrating an example 200 of training and using a machine learning model in connection with detecting anomalous IAM action events. The machine learning model training and usage described herein may be performed using a machine learning system. The machine learning system may include or may be included in a computing device, a server, a cloud computing environment, or the like, such as the detection system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the first user device or the detection system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the first user device or the detection system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a purpose section of a change order, a second feature of an environment section of a change order, a third feature of an implementation plan section of a change order, and so on. As shown, for a first observation, the first feature may have a value of $CO\_Purp_A$, the second feature may have a value of $CO\_Env_A$, the third feature may have a value of $CO\_IP_A$, and so on. These features and feature values are provided as examples, and may differ in other examples. For example, the feature set may include one or more of the following features: a backup plan section of a change order, a validation plan section of a change order, or another section of a change order.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is one or more IAM actions, which has a value of $IAM\_Actions_A$ for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations. For example, using a random forest algorithm, the machine learning system may train a machine learning model to output (e.g., at an output layer) one or more expected IAM actions based on an input (e.g., one or more change order sections), as described elsewhere herein. In particular, the machine learning system, using the random forest algorithm, may train the machine learning model, using the set of observations from the training data, to generate a "random forest" of unique decision trees (e.g., based on random features of a feature set of the machine learning model) that are configured to independently make predictions (e.g., one or more expected IAM actions). The machine learning model then is trained to combine predictions of the decision trees (e.g., through voting or averaging) to facilitate transformation of the input of the machine learning model to an output (e.g., one or more expected IAM actions) of the machine learning model. After training, the machine learning system may store the machine learning model as a trained machine learning model 225 to be used to analyze new observations.

As an example, the machine learning system may obtain training data for the set of observations based on change order training data (e.g., data associated with a plurality of change orders that have been previously analyzed) and IAM action training data (e.g., that indicates IAM actions for at least some of the plurality of change orders). The machine learning system may obtain the training data from one or more data structures associated with the first user device, the detection system, and/or another device.

As shown by reference number 230, the machine learning system may apply the trained machine learning model 225 to a new observation, such as by receiving a new observation and inputting the new observation to the trained machine learning model 225. As shown, the new observation may include a first feature of $CO\_Purp_X$, a second feature of $CO\_Env_X$, a third feature of $CO\_IP_X$, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of $IAM\_Actions_X$ for the target variable of one or more expected IAM Actions for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may be re-trained using feedback information. For example, feedback may be provided to the machine learning model. The feedback may be associated with actions performed based on the predicted values provided by the trained machine learning model 225. In other words, the predicted values output by the trained machine learning model 225 may be used as inputs to re-train the machine learning model (e.g., a feedback loop may be used to train and/or update the machine learning model). For example, the feedback information may include whether the predicted values are accurate.

In this way, the machine learning system may apply a rigorous and automated process to determining one or more expected IAM actions for a change order. The machine learning system may enable recognition and/or identification of tens, hundreds, thousands, or millions of features and/or feature values for tens, hundreds, thousands, or millions of observations, thereby increasing accuracy and consistency and reducing delay associated with determining or more expected IAM actions for a change order relative to requiring computing resources to be allocated for tens, hundreds, or thousands of operators to manually determining or more expected IAM actions using the features or feature values.

As indicated above, FIG. 2 is provided as an example. Other examples may differ from what is described in connection with FIG. 2.

Figure 3:
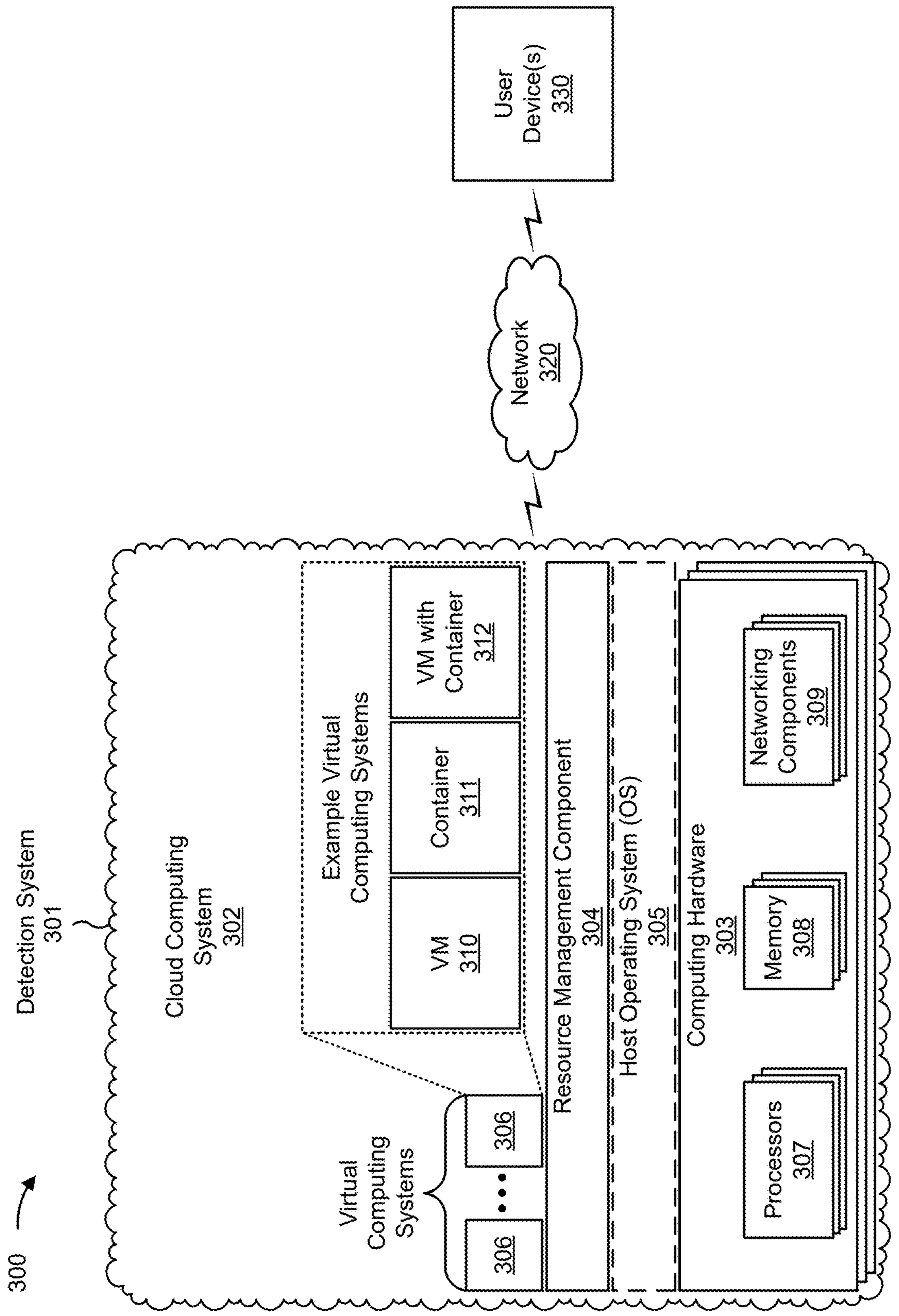
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a detection system 301, which may include one or more elements of and/or may execute within a cloud computing system 302. The cloud computing system 302 may include one or more elements 303-312, as described in more detail below. As further shown in FIG. 3, environment 300 may include a network 320, and/or one or more user devices 330. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the detection system 301 may include one or more elements 303-312 of the cloud computing system 302, may execute within the cloud computing system 302, and/or may be hosted within the cloud computing system 302, in some implementations, the detection system 301 may not be cloud-based (e.g., may be implemented outside of a cloud computing system) or may be partially cloud-based. For example, the detection system 301 may include one or more devices that are not part of the cloud computing system 302, such as device 400 of FIG. 3, which may include a standalone server or another type of computing device. The detection system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
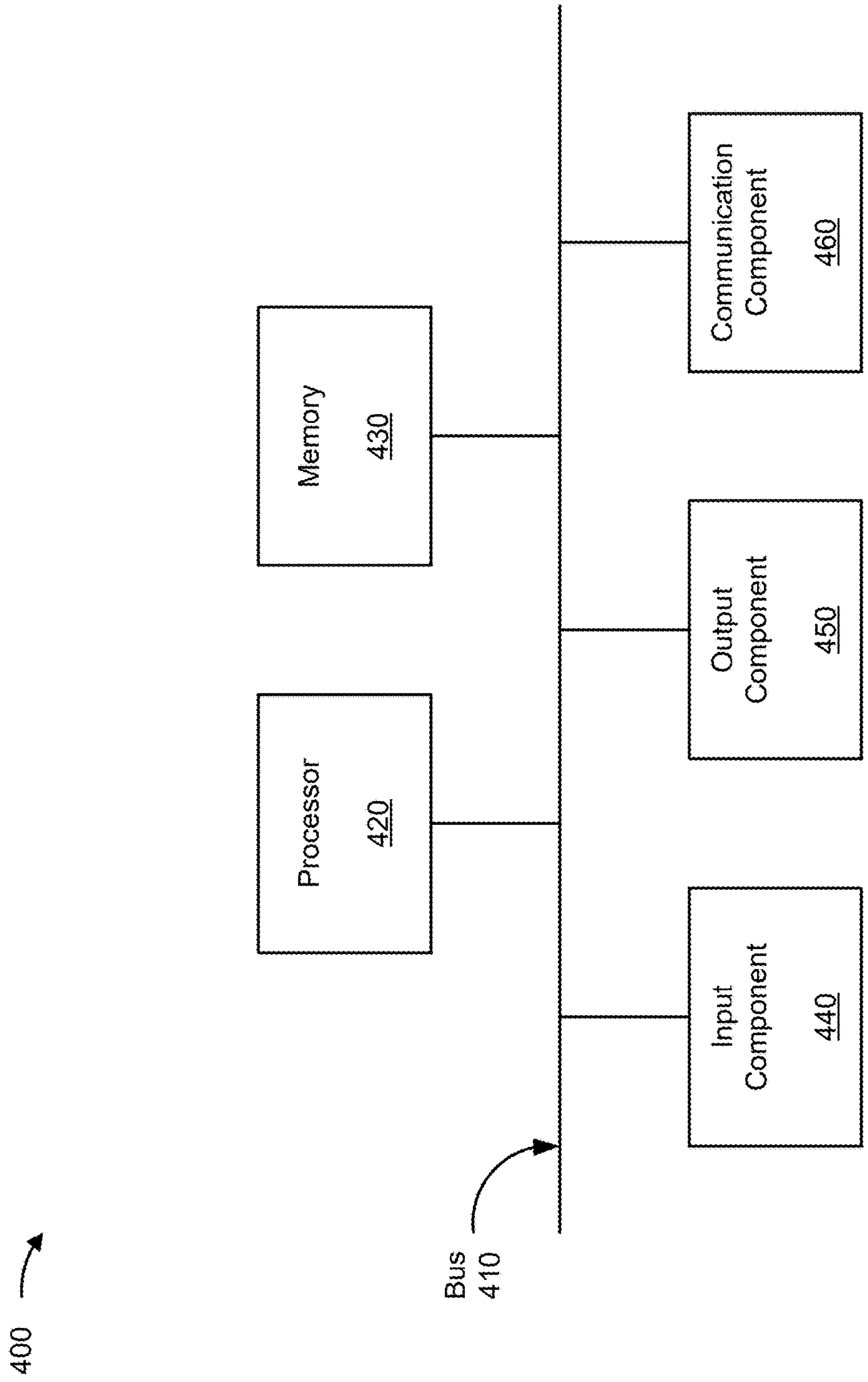
FIG. 4 is a diagram of example components of a device associated with detecting anomalous IAM action events, in accordance with some embodiments of the present disclosure.

FIG. 4 is a diagram of example components of a device 400 associated with detecting anomalous IAM action events. The device 400 may correspond to the detection system 301, the computing hardware 303, and/or the user device 330. In some implementations, the detection system 301, the computing hardware 303, and/or the user device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
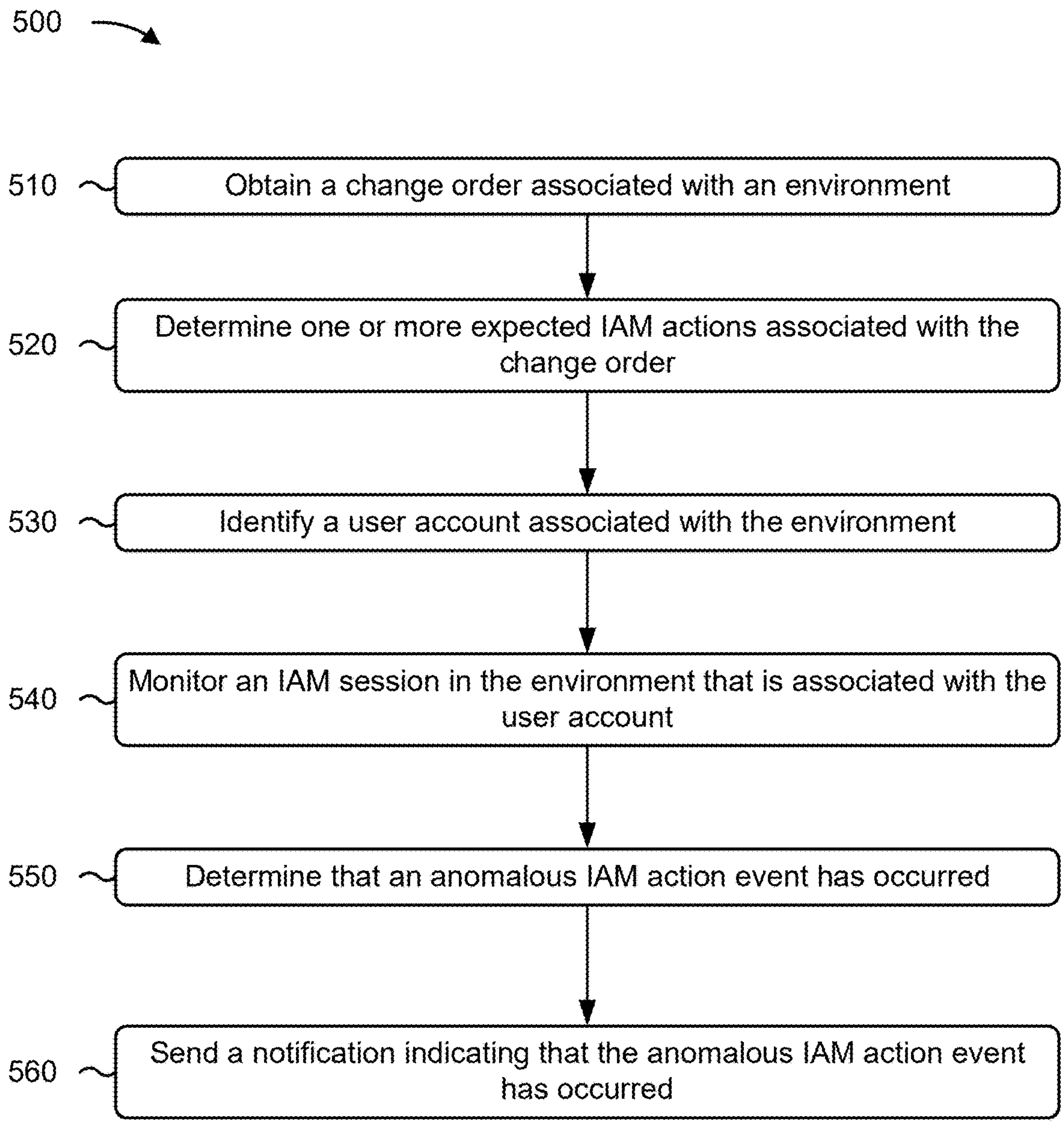
FIG. 5 is a flowchart of an example process associated with detecting anomalous IAM action events, in accordance with some embodiments of the present disclosure.

FIG. 5 is a flowchart of an example process 500 associated with detecting anomalous IAM action events. In some implementations, one or more process blocks of FIG. 5 may be performed by the detection system 301. In some implementations, one or more process blocks of FIG. 5 may be performed by another device or a group of devices separate from or including the detection system 301, such as the computing hardware 303 and/or the user device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining a change associated with an environment (block 510). For example, the detection system 301 (e.g., using processor 420, memory 430, input component 440, and/or communication component 460) may obtain a change order that indicates associated with an environment, as described above in connection with reference number 102 of FIG. 1A. As an example, the detection system 301 may obtain (e.g., from the user device 330) a change order that indicates one or more changes to be implemented in the environment.

As further shown in FIG. 5, process 500 may include determining one or more expected IAM actions associated with the change order (block 520). For example, the detection system 301 (e.g., using processor 420 and/or memory 430) may determine one or more expected IAM actions associated with the change order, as described above in connection with reference number 104 of FIG. 1A. As an example, the detection system 301 may process, using a machine learning model, the change order to generate the one or more expected IAM actions.

As further shown in FIG. 5, process 500 may include identifying a user account associated with the environment (block 530). For example, the detection system 301 (e.g., using processor 420 and/or memory 430) may identify a user account associated with the environment, as described above in connection with reference number 106 of FIG. 1B. As an example, the detection system 301 may identify a user account associated with implementing the one or more changes in the environment.

As further shown in FIG. 5, process 500 may include monitoring an IAM session in the environment that is associated with the user account (block 540). For example, the detection system 301 (e.g., using processor 420 and/or memory 430) may monitor an IAM session in the environment that is associated with the user account, as described above in connection with reference number 108 of FIG. 1B. As an example, the detection system may monitor an IAM session in the environment that is associated with the user for an activity of the user account.

As further shown in FIG. 5, process 500 may include determining that an anomalous IAM action event has occurred (block 550). For example, the detection system 301 (e.g., using processor 420 and/or memory 430) may determine that an anomalous IAM action event has occurred, as described above in connection with reference number 110 of FIG. 1C. As an example, the detection system 301 may determine, based on monitoring the IAM session and based on the one or more expected IAM actions, that an anomalous IAM action event has occurred.

As further shown in FIG. 5, process 500 may include sending a notification indicating that the anomalous IAM action event has occurred (block 560). For example, the detection system 301 (e.g., using processor 420, memory 430, and/or communication component 460) may send a notification indicating that the anomalous IAM action event has occurred, as described above in connection with reference number 112 of FIG. 1C. As an example, the detection system 301 may send, to another device and based on determining that an anomalous IAM action event has occurred, a notification indicating that the anomalous IAM action event has occurred.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting anomalous identity and access management (IAM) actions, the system comprising:

one or more memories; and one or more processors, communicatively coupled to the one or more memories, configured to:

obtain a change order that includes a plan comprising one or more changes to be implemented in an environment;

determine, based on the change order and a machine learning model, one or more expected IAM actions to implement the change order, wherein the machine learning model was trained with data associated with a plurality of prior change orders;

identify, based on determining the one or more expected IAM actions, a user account for implementing the one or more changes in the environment;

monitor an IAM session in the environment that is associated with the user account implementing the one or more changes;

determine an IAM action implemented in the environment, based on monitoring the IAM session; and determine, based on the IAM action not being included in the one or more expected IAM actions, that an anomalous IAM action event has occurred; and send, to another device and based on determining that the anomalous IAM action event has occurred, a notification indicating that the anomalous IAM action event has occurred.

2. The system of claim 1, wherein the one or more processors are further configured to:

cause, based on determining that the anomalous IAM action event has occurred, the IAM session to be terminated.

3. The system of claim 1, wherein the one or more processors are further configured to:

cause, based on determining that the anomalous IAM action event has occurred, one or more IAM permission parameters to be removed from the user account.

4. The system of claim 1, wherein the one or more processors are further configured to:

cause, based on determining that the anomalous IAM action event has occurred, a user authentication operation associated with the user account to commence.

5. The system of claim 1, wherein the one or more processors, to monitor the IAM session, are configured to:

cause a tracking function to be enabled in the environment that is associated with the user account for the IAM session; and process log information associated with the user account for the IAM session that is generated as a result of enablement of the tracking function.

6. The system of claim 1, wherein the one or more processors, to determine that the anomalous IAM action event has occurred, are configured to:

generate, based on the one or more expected IAM actions, an anomalous IAM action event filter;

identify, based on monitoring the IAM session, an IAM action implemented in the environment; and cause the anomalous IAM action event filter to be applied to the IAM action to determine that the anomalous IAM action event has occurred.

7. The system of claim 1, wherein the one or more processors are further configured to:

determine a risk category associated with the anomalous IAM action event; and generate the notification to indicate the anomalous IAM action event and the risk category.

8. A non-transitory computer-readable medium storing a set of instructions, the set of instructions comprising:

one or more instructions that, when executed by one or more processors of a system for detecting anomalous identity and access management (IAM) actions, cause the system to:

obtain a change order that includes a plan comprising one or more changes to be implemented in association with an environment;

determine, based on the change order and a machine learning model, one or more expected IAM actions to implement the change order, wherein the machine learning model was trained with data associated with a plurality of prior change orders;

identify, based on determining the one or more expected IAM actions, a user account for implementing the one or more changes in the environment;

monitor an IAM session in the environment that is associated with the user account implementing the one or more changes;

determine an IAM action implemented in the environment based on monitoring the IAM session;

determine, based on the IAM action not being included in the one or more expected IAM actions, that an anomalous IAM action event has occurred; and send a notification indicating that the anomalous IAM action event has occurred based on determining that the anomalous IAM action event has occurred.

9. The non-transitory computer-readable medium of claim 8, wherein the one or more instructions, when executed by the one or more processors, further cause the system to cause, based on determining that the anomalous IAM action event has occurred, at least one of:

the IAM session to be terminated;

one or more IAM permission parameters to be removed from the user account; or a user authentication operation associated with the user account to commence.

10. The non-transitory computer-readable medium of claim 8, wherein the one or more instructions, that cause the system to monitor the IAM session, cause the system to:

process log information, associated with the user account for the IAM session, that is generated as a result of enablement of a tracking function in the environment.

11. The non-transitory computer-readable medium of claim 8, wherein the one or more instructions, that cause the system to determine that the anomalous IAM action event has occurred, cause the system to:

cause, based on monitoring the IAM session, an anomalous IAM action event filter, which is based on the one or more expected IAM actions, to be applied to an IAM action implemented in the environment.

12. The non-transitory computer-readable medium of claim 8, wherein the notification also indicates a risk category associated with the anomalous IAM action event.

13. A method, comprising:

obtaining, by a system for detecting anomalous identity and access management (IAM) actions, a change order that includes a plan comprising one or more changes to be implemented in an environment;

determining, by the system and based on the change order associated with the environment and a machine learning model, one or more expected IAM actions to implement the change order, wherein the machine learning model was trained with data associated with a plurality of prior change orders;

identifying, by the system and based on determining the one or more expected IAM actions, a user account for implementing the one or more changes in the environment;

monitoring, by the system, an IAM session in the environment that is associated with the user account for implementing the one or more changes of the change order;

determining, by the system, an action implemented in the environment based on monitoring the IAM session;

determining, by the system and based on the IAM action not being included in the one or more expected IAM actions, that an anomalous IAM action event has occurred; and causing, by the system and based on determining that the anomalous IAM action event has occurred, a notification to be sent indicating that the anomalous IAM action event has occurred.

14. The method of claim 13, further comprising:

causing at least one of:

the IAM session to be terminated;

one or more IAM permission parameters to be removed from a user account associated with the IAM session; or a user authentication operation associated with the user account to commence.

15. The system of claim 1, wherein the one or more processors, to obtain the change order that indicates the one or more changes to be implemented in the environment, are to:

obtain the change order from a user device.

16. The non-transitory computer-readable medium of claim 8, wherein the one or more instructions, that cause the system to obtain the change order associated with the environment, cause the system to:

obtain the change order from a user device.

17. The method of claim 13, further comprising:

obtaining the change order from a user device.

18. The system of claim 1, wherein the notification also indicates a risk category associated with the anomalous IAM action event.

19. The non-transitory computer-readable medium of claim 8, wherein the one or more instructions, that cause the system to monitor the IAM session, cause the system to:

determine a risk category associated with the anomalous IAM action event; and generate the notification to indicate the anomalous IAM action event and the risk category.

20. The method of claim 13, further comprising:

determining a risk category associated with the anomalous IAM action event; and generating the notification to indicate the anomalous IAM action event and the risk category.

* * * * *